Nov. 6, 1951  M. A. WHITAKER  2,574,453
LAWN EDGER
Filed May 11, 1948  2 SHEETS—SHEET 1
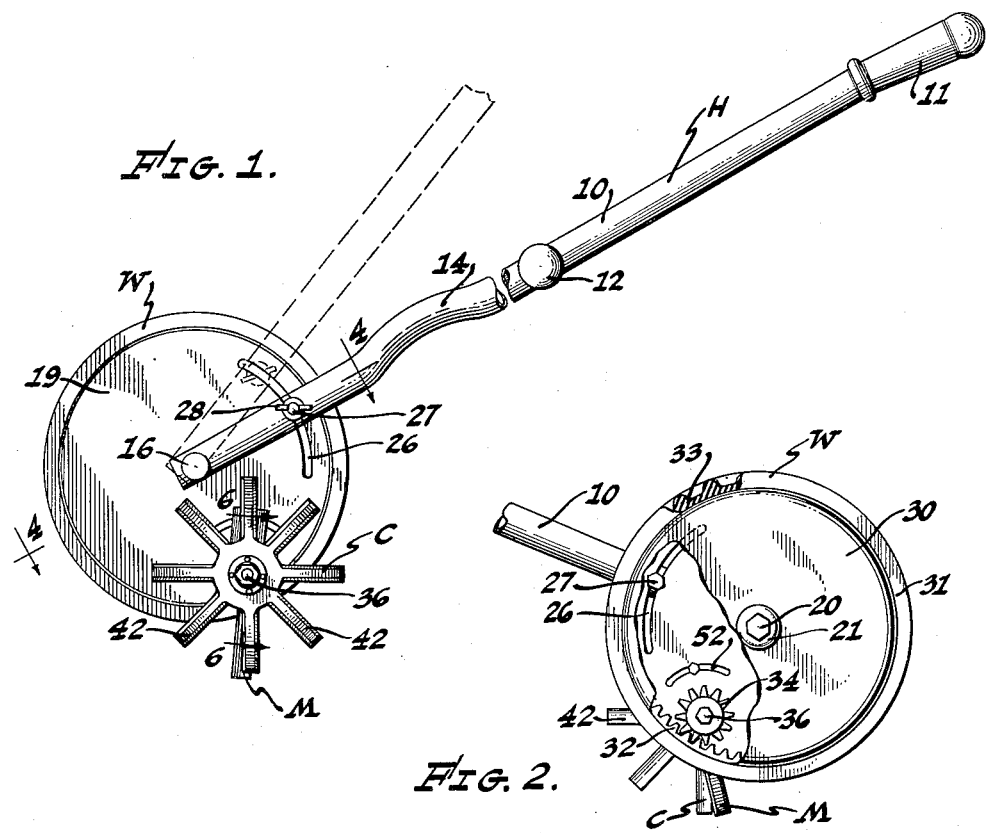
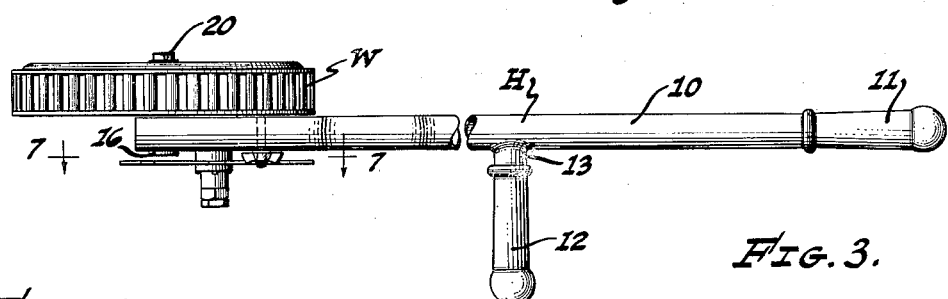
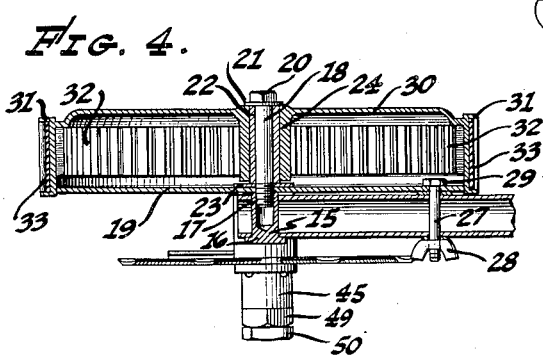
INVENTOR.
MARVIN A. WHITAKER
BY
ATTORNEY

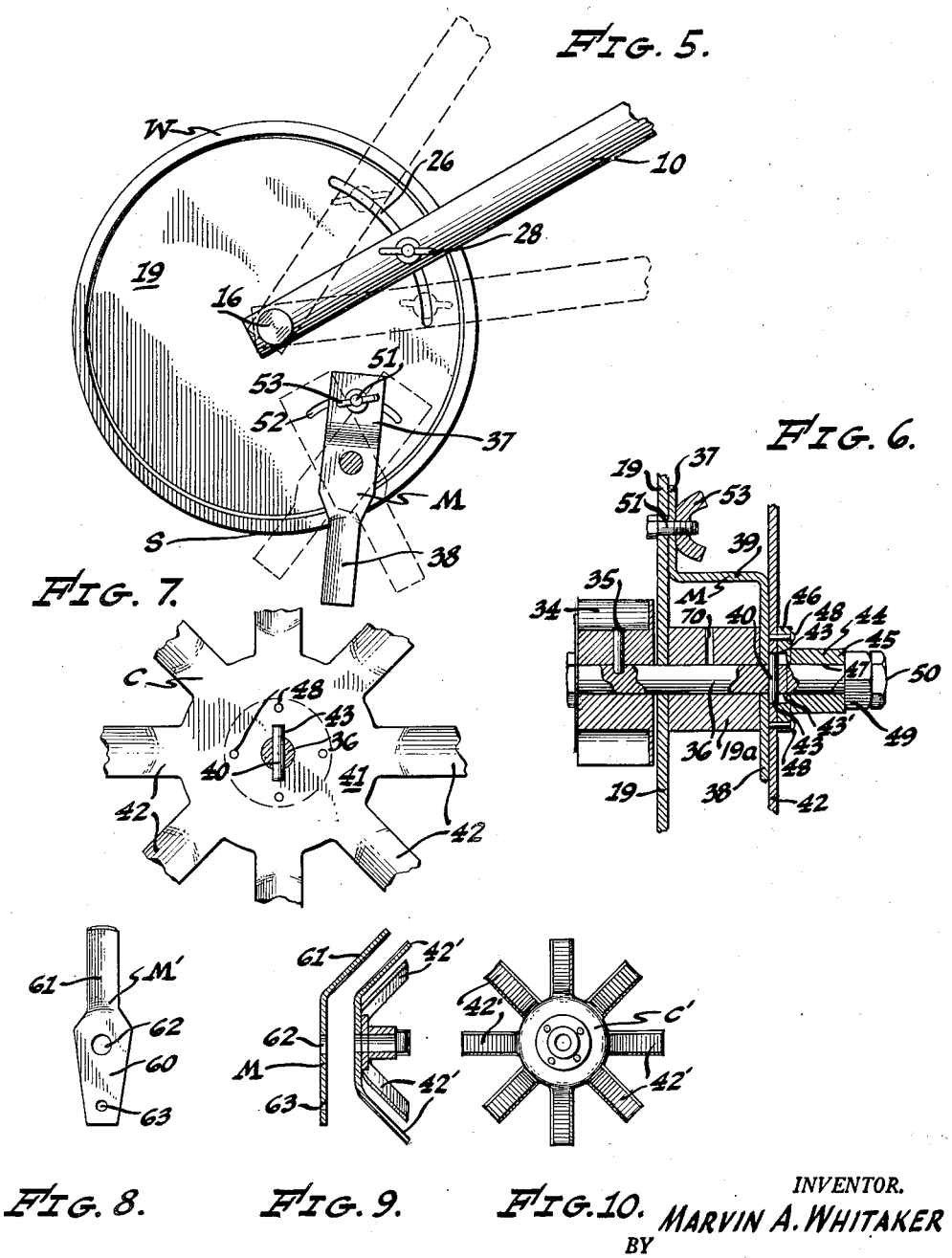

Patented Nov. 6, 1951

2,574,453

UNITED STATES PATENT OFFICE 2,574,453

LAWN EDGER

Marvin A. Whitaker, Bellflower, Calif.

Application May 11, 1948, Serial No. 26,352

5 Claims. (Cl. 56—256)

My invention relates to the field of rotary cutting devices, and more particularly to a lawn edger.

Although numerous lawn edgers have been devised and used in the past these implements have the disadvantages that the handle portion thereof must be held at a predetermined vertical angle irrespective of the height of the individual operating the device, and in addition there is little or no control over the vertical depth to which the implement will edge.

It is therefore to provide a light weight lawn edger that will eliminate the above mentioned disadvantages that I have devised my present invention.

A major object of my invention is to provide a lawn edger having a handle for operating the device which may be disposed at the particular vertical angle which is most convenient for the operator using the implement, that will have a vertically adjustable cutting blade mechanism which can be set for the particular job at hand, will have the internal working members of the device completely enclosed to protect them from the abrasive action of dust and dirt, and will have such a simple mechanical structure that the cost of maintaining the device will be held to a minimum.

Another object of my invention is to supply a portable edger that can be fabricated from standard materials and parts, can be manufactured at a relatively low cost, and hence retailed in the medium priced merchandising field for the use of both the professional gardener and the small home owner.

These and other objects and advantages of my invention will become apparent from the following description of a preferred form thereof and the drawings illustrating that form in which:

Fig. 1 is a side elevational view of the device in an edging position;

Fig. 2 is a side elevational view of the lower portion of the device with parts thereof cut away to illustrate the interior thereof;

Fig. 3 is a plan view of the device with parts broken away;

Fig. 4 is a cross-sectional view of the lower portion of the device taken on the line 4—4 of Fig. 1;

Fig. 5 is a side elevational view of the lower portion of the device with the star-shaped cutting member removed therefrom;

Fig. 6 is a fragmentary cross-sectional view of the driving mechanism and cutting members taken on the line 6—6 of Fig. 1;

Fig. 7 is a fragmentary elevational view of the central portion of the star-shaped cutting member taken on the line 7—7 of Fig. 3;

Fig. 8 is a side elevational view of an alternate form of stationary cutting member;

Fig. 9 is a vertical cross-sectional view of an alternate form of rotatable cutting member adapted to cooperate with the stationary member shown in Fig. 8; and Fig. 10 is a front elevational view of the alternate form of cutting member shown in Fig. 9.

Referring now to Figs. 1 and 2 for the general arrangement of my invention, it will be seen that a handle H rotatably supports on the lower end thereof an internally geared drive wheel W that is adapted to be rolled over a fibrous surface, and when being so rolled rotates a star-shaped cutting member C which cooperates with an adjustable, normally stationary, cutting member M to sever fibrous material situated therebetween.

The handle H is preferably fabricated from an upwardly extending piece of tube stock 10 that is formed from aluminum or a similar light weight material, and for convenience in operating the implement is provided on the outer end with a cylindrical hand grip 11. A second hand grip 12 of similar design is supported in a position normal to the tube 10 on an arm 13 that is affixed thereto. The portion of the handle H adjacent to the wheel W is formed with an upwardly extending curved portion 14 that is used by an individual in manually carrying the edger from one place to another.

The lower portion of the handle H is formed with a horizontal bore therein through which extends a hollow tubular member 15 that is provided on the exterior end with a cap 16, and on the opposite end with an internally tapped portion 17. A bolt 18 engages the tapped portion 17, with the bolt serving not only as a mounting for rotatably supporting the wheel W, but as a support for a stationary annular plate 19 that encloses one side of the wheel. The bolt 18, as best seen in Fig. 4, is provided with a head 20 that presses a washer 21 inwardly as the bolt is tightened in the threaded portion 17 of the tubular member.

As the washer 21 is pressed inwardly it engages the outer end of a tubular member 22 which surrounds the bolt 18, and moves the member 22 inwardly with the result that the plate 19 is held in a non-rotating position by the annular spacing washers 23 provided on each side thereof being pressed inwardly against the plate. The hub portion 24 of the wheel W is of a width slightly less than that of the tubular member 22 on which it is rotatably mounted, with the result that irrespective of how much the bolt 18 is tightened the wheel W will remain in a freely rotatable condition on the member 22.

Although the handle H rotates on the member 17 when it is being vertically adjusted, it is essential that the handle and plate 19 remain normally in a fixed relationship with one another to maintain the correct positions for the cutting members C and M. Such vertical adjustment of the handle H is made possible by the plate 19 being formed with a downwardly and rearwardly extending curved slot 26, as best seen in Fig. 1, through which a bolt 27 extends outwardly. The bolt 27 passes through a bore formed in the lower portion of handle H, and has a wing nut 28 engaging its outer end. Thus, upon the handle H being placed at the desired vertical angle, the wing nut 28 can be tightened to hold the handle H and plate 19 in a fixed relationship with one another due to these members being drawn together between the interior faces of the wing nut 28 and the head 29 formed on the bolt 27.

The driving wheel W is formed from an annular plate 30 that extends outwardly from the hub 24 to terminate in an inwardly extending rim 31 that is provided with a series of gear teeth 32 on the interior face thereof. To better secure traction when the wheel W is being rolled over the relatively smooth surface of grass or fibrous material the exterior surface of the rim 31 is preferably provided with a tire 33 that is formed from a resilient material such as rubber. As is customary in such tires the external surface thereof is formed with a series of corrugations to better secure traction on the grassy or fibrous surface on which the tire rolls.

In Fig. 6, it will be seen that a pinion 34 engages the gear teeth 32, with the pinion being rigidly affixed by a pin 35 to a horizontally positioned supporting shaft 36. The shaft 36 is rotatably mounted in a bore that extends through the lower portion of the plate 19 and a cylindrical boss 19a formed on the outer surface thereof.

The shaft 36 also serves as a mounting for the stationary cutting member M, which is formed from upwardly and downwardly extending rectangular bars 37 and 38 respectively, which are connected on their interior end portions by a horizontal cross-piece 39. A transversely positioned pin 40 is positioned on the shaft 36 adjacent to the exterior face of the member 38, and serves to engage the cutting member C whereby it will be driven when mounted on the shaft.

The annular cutting member C is preferably formed from high grade sheet steel, and has a central portion 41 from which rectangular cutting blades 42 extend outward radially to impart a star-like appearance to the cutter. Centrally disposed in the cutting member portion 41 is a bore slightly larger than that of the shaft 36 which it is adapted to engage, and having two oppositely disposed rectangular slots 43 extending outwardly therefrom. Each of the slots 43 is of a size that will permit one end portion of the pin 40 to pass therethrough for reasons which will hereinafter be explained.

To maintain the cutting member C in a substantially vertical position when it is mounted on the shaft 36 a hub-like member 44 is provided. The hub 44 is formed from a cylindrical portion 45 having an outwardly extending annular flange 46 on one end thereof and a bore 47 that extends longitudinally through the hub and flange. Two oppositely disposed slots 43'' that are identical to the slots 43 extend outwardly from the bore 47 in that portion thereof situated in the flange 46. By the use of rivets 48 the cutting member C is affixed to the outer face of the flange 46 in a conventional manner to form an integral unit, and having the slots 43 and 43' in vertical alignment with one another.

With the cutting member C thus affixed to the hub 44 it can be slidably mounted on the shaft 36, and due to the pin 40 engaging the slots 43', the cutting member will be driven whenever the shaft is rotated, yet may be slidably removed therefrom when the occasion so requires. A nut 49 and locking nut 50 engage the outer threaded end of the shaft 36 and maintain the cutting member C and hub 44 in position thereon.

To hold the stationary cutting bar 38 in the desired position whereby it will project a predetermined distance below the surface S on which the wheel W rolls, the member 37 is provided with a horizontal bore that is in vertical alignment with a curved and downwardly extending slot 52 formed in the lower portion of the plate 19. A bolt 51 extends outwardly through the slot 52 to engage the bore formed in bar 37, and serves to hold the cutting bar 38 in the desired position when a wing nut 53 is tightened on the bolt to force the members 19 and 37 together in a nonmovable position. Of course, by loosening the wing nut 53 the cutting member M may be rotated on the shaft 36 to place bar 38 in the desired position.

In Figs. 1 and 2, it will be noted that the engaging faces of the bar 38 and blades 42 are slightly concave, with the face of member 38 sloping inwardly, and the faces of the blades 42 outwardly. Thus as the blades 42 rotate, the longitudinal outer edges thereof contact similar portions of the bar 38 with the result that as wear takes place the edges of the bar and blades remain sharp. To compensate for such wear, the nuts 49 and 50 are periodically tightened the required amount to move the cutting member C inwardly on the shaft 36 until the longitudinal edges of the blades 42 are again contacting the edges of the bar 38.

Upon occasion, it may be found desirable to use a stationary cutting member M' and cutting member C' of a design different from those previously described, particularly in the feather edging of grass along walks and walls.

The stationary cutting member M' is formed from a substantially rectangular member 60 which supports from the lower portion thereof a downwardly and outwardly extending cutting bar 61. The member 60 is formed with a horizontal bore 62 therein which engages the shaft 36, and a bore 63 formed thereabove that engages the bolt 51 in the same manner as that used with member M.

In Fig. 9 it will be seen that the cutting member C' is identical with member C with the exception that the blades 42' extend outwardly from the central portion 41 at the same angle as the bar 61. To use the member C' for cutting purposes the nuts 49 and 50 are loosened, and the cutting member C removed from the shaft 36 and replaced by the member C'. Likewise, the stationary cutting member M is replaced by the member M'. With such an interchange of members completed, the cutting bar 61 is contacted by the blades 42', and the member C' is rotated in the same manner as previously described in connection with the cutting members M and C.

From experience I have determined that the cutting member C' and stationary member M' cooperate best in the cutting of fibrous material when the engaging faces thereof are convex and concave respectively. Lateral adjustment of the members M' and C' is secured by the use of the previously described nuts 49 and 50. Thus, as the engaging faces of the blades 42' and bar 61 wear, the edges thereof will remain sharp. To compensate for such wear the nuts 49 and 50 are tightened to move the member C' inwardly until the proper contact is again established between the engaging longitudinal edges of the blades 42' and bar 61.

The operation of my lawn edger is extremely simple. The device is picked up by the handle portion 14 from the place where the implement is normally stored and carried to the location where the work is to be done. The wing nut 28 is loosened, and the handle H rotated on the tubular member 15 to the vertical inclination that best suits the height of the individual using the implement. With the handle H properly positioned, the wing nut 28 is tightened to hold the handle H and the plate 19 together in a fixed position. The lawn to be edged is then inspected, and the cutting member M adjusted to the vertical depth which it is desired to have the bar 38 project beneath the surface S by loosening the wing nut 53 and rotating the member on the shaft 36. To maintain the member 38 in this position during the cutting operation the wing nut 53 is tightened to hold the cutting member 37 and the plate 19 together in a fixed position.

With one hand of the operator grasping the handle 11 and the other hand similarly grasping the handle 12, the implement is moved forwardly along the surface S whereby the wheel W will be rotated due to the friction between the exterior surface of the tire 33 and the grass or fibrous material upon which it is rotated. It will be apparent that as the wheel W rotates the gear teeth 32 will drive the pinion 34 to rotate shaft 36, with the result that the pin 39 provided thereon rotates the cutting member C due to it engaging the slots 43 formed in the hub-like member 44. As the cutting member C rotates and the implement is moved forwardly the grass or fibrous material growing or extending downwardly over the substantially vertical earth surface over which the stationary cutting bar 38 passes will be severed between this bar and the rotating cutting blades 42.

Should it not be desired to use the stationary cutting member M, the alternate form of cutting member M' may be utilized which extends downwardly and outwardly at an angle, and it is particularly useful in the feather edging grass along a walk or wall. Of course, in the use of the member M' the member M must be removed from its normal position as shown in Fig. 5, and the member M' substituted therefor. With the substitution of the member M' the rotating cutting member C' is also placed on the shaft 36 and the nuts 49 and 50 returned to their normal position to hold the members in place thereon.

It will be noted that the operation of my implement is the same whether the cutting member C or C' is used therewith, with the choice of the proper cutting member being left to the operator of the implement who with a small amount of experience will be able to judge which member should be used for a particular job.

As the interior working parts of my invention are completely enclosed by the annular members 19 and 30 little or no maintenance is required. However, periodically a small amount of oil should be placed on the shaft 36 which is accomplished in a conventional manner by the use of a bore 70 formed in the boss 19a for this purpose. Other than this operation, my lawn edger required little attention during the seasons that it will be used, other than the care which is ordinarily taken in preserving an implement in good working order.

While the above device herein described is fully capable of attaining the objects and providing the advantages hereinbefore stated, it is to be understood that it is merely illustrative of the presently preferred form of my invention, and that I do not mean to limit myself to the details of construction herein shown and described other than as defined in the appended claims.

I claim:

1. A lawn edger which includes: a vertically positioned plate having a curved slot and centrally disposed bore formed therein; a boss extending outwardly from said plate formed with a longitudinal bore therein which extends through said plate; a tubular member having a cap on one end and provided with internal threads on the opposite end, with said member rotatably positioned in said bore; an elongated handle rotatably mounted on said tubular member for independent arcuate adjustment; a bolt engaging said slot and a bore provided in said handle whereby upon a wing nut being tightened on said bolt said plate and handle are locked together as an integral unit; a bolt engaging said threaded portion of said tubular member; a tubular member mounted on said bolt; a wheel having a hub of less width than said bolt supported tubular member, and said wheel rotatably mounted thereon; a pinion, with said pinion engaging gear teeth provided on the interior periphery of said wheel; a shaft rotatably supported in said bore formed in said boss, with said shaft being rigidly affixed on one end to said pinion, and provided on the opposite end with a threaded portion; a cutting member pivotally supported on said shaft, with said member having a bore formed therein; a bolt engaging said slot and said bore formed in said cutting member whereby said member can be independently adjusted; a pin transversely positioned on said shaft; a star-shaped rotatable cutting member having a centrally disposed slotted bore formed therein, with said rotatable cutting member slidably mounted on said shaft and rotated by said pin engaging said slotted bore; and a locking nut engaging said threaded shaft portion to maintain said rotatable cutting member in position on said shaft.

2. A lawn edger which includes: a vertically positioned plate having a curved slot and centrally disposed bore formed therein; a boss extending outwardly from said plate formed with a longitudinal bore therein which extends through said plate; a tubular member having a cap on one end and provided with internal threads on the opposite end, with said member rotatably positioned in said bore; an elongated handle rotatably mounted on said tubular member for independent arcuate adjustment; a bolt engaging said slot and said handle for locking said plate and handle together as an integral unit; a bolt engaging said threaded portion of said tubular member; a tubular member mounted on said bolt; a wheel having a hub of less width than said bolt-supported tubular member and said wheel rotatably mounted thereon; a pinion, with said pinion engaging gear teeth provided on the interior periphery of said wheel; a shaft rotatably supported in said bore formed in said boss, with said shaft being rigidly affixed on one end to said pinion; a cutting member pivotally supported on said shaft, with said member having a bore formed therein; a bolt engaging said slot and said bore formed in said cutting member whereby said member can be independently adjusted; and a star-shaped rotatable cutting member affixed on said shaft for rotation therewith.

3. A lawn edger which includes: a vertically positioned plate having a curved slot and centrally disposed bore formed therein; an axle rotatably mounted in said bore; an elongated handle rotatably mounted on said axle for independent arcuate adjustment; a bolt engaging said slot and said handle to lock said plate and handle together as an integral unit; a wheel rotatably mounted on said axle; a pinion, with said pinion engaging gear teeth provided on the interior periphery of said wheel; a shaft rotatably supported in said plate, with said shaft being rigidly affixed on one end to said pinion, and provided on the opposite end with a threaded portion; a cutting member pivotally supported on said shaft, said member having an upper adjustment arm; a bolt engaging said adjustment arm and a second curved slot formed in said plate for independent pivotal adjustment of said cutting member; a pin transversely positioned on said shaft; a star-shaped rotatable cutting member having a centrally disposed slotted bore formed therein, with said rotatable cutting member slidably mounted on said shaft and rotated by said pin engaging said slotted bore; and a locking nut engaging said threaded shaft portion to maintain said rotatable cutting member in position on said shaft.

4. A lawn edger which includes: a plate having a curved slot and centrally disposed bore formed therein; a tubular member having a cap on one end and provided with internal threads on the opposite end, with said member rotatably positioned in said bore; an elongated handle rotatably mounted on said tubular member for independent arcuate adjustment; a bolt engaging said slot and said handle to lock said plate and handle together as an integral unit; a bolt engaging said threaded portion of said tubular member; a tubular member mounted on said bolt; a wheel having a hub of less width than said bolt-supported tubular member and said wheel rotatably mounted thereon; a pinion, with said pinion engaging gear teeth provided on the interior periphery of said wheel; a shaft rotatably mounted in said plate, said shaft being rigidly affixed on one end to said pinion end and provided on the other end with a threaded portion; a cutting member pivotally supported on said shaft, with said member having a bore formed therein; a bolt engaging said slot and said bore formed in said cutting member whereby said member can be independently adjusted; and a star-shaped rotatable cutting member affixed on said shaft for rotation therewith.

5. A lawn edger which includes: a plate having a curved slot and centrally disposed bore formed therein; an axle rotatably mounted in said bore; a handle rotatably mounted on said axle member for independent arcuate adjustment; a bolt engaging said slot and said handle to lock said plate and handle together; a wheel rotatably mounted on said axle; a pinion, with said pinion engaging gear teeth provided on the interior periphery of said wheel; a shaft rotatably supported in said plate with said shaft being rigidly affixed on one end to said pinion; a cutting member pivotally supported on said shaft, with said member having an upper adjustment arm; a bolt engaging said arm and a slot formed in said plate to adjustably lock said member and plate together; and a star-shaped rotatable cutting member affixed to said shaft for rotation therewith.

MARVIN A. WHITAKER.

REFERENCES CITED

The following references are of record in the file of this patent:

UNITED STATES PATENTS

| Number | Name | Date |
|---|---|---|
| 223,505 | Hanley | Jan. 13, 1880 |
| 456,928 | Adams | Aug. 4, 1891 |
| 584,041 | Kelley | June 8, 1897 |
| 1,752,505 | Pickett | Apr. 1, 1930 |
| 1,912,893 | Engel | June 6, 1933 |
| 2,212,057 | Waller | Aug. 20, 1940 |

FOREIGN PATENTS

| Number | Country | Date |
|---|---|---|
| 123,949 | Great Britain | Mar. 13, 1919 |